(12) United States Patent
Betts

(10) Patent No.: US 6,810,011 B1
(45) Date of Patent: *Oct. 26, 2004

(54) PROTECTION SWITCHING WITHIN AN OP-N LAYER

(75) Inventor: Malcolm Betts, Kanata (CA)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 738 days.

(21) Appl. No.: 09/617,224

(22) Filed: Jul. 17, 2000

(51) Int. Cl.[7] .......................... H04L 1/22; G06F 11/20
(52) U.S. Cl. .......................... 370/228; 370/242; 398/5; 398/17; 455/8
(58) Field of Search ................................ 370/216, 217, 370/221–223, 225–228, 360; 398/1–5; 455/7–8

(56) References Cited

U.S. PATENT DOCUMENTS

| | | | |
|---|---|---|---|
| 6,147,968 A * | 11/2000 | De Moer et al. | 370/225 |
| 6,256,292 B1 * | 7/2001 | Ellis et al. | 370/227 |
| 6,301,254 B1 * | 10/2001 | Chan et al. | 370/397 |
| 6,366,556 B1 * | 4/2002 | Ballintine et al. | 370/216 |
| 6,512,611 B1 * | 1/2003 | Phelps et al. | 398/4 |
| 6,526,021 B1 * | 2/2003 | Dempsey | 370/227 |
| 6,614,754 B1 * | 9/2003 | Usuba et al. | 370/222 |
| 6,616,350 B1 * | 9/2003 | de Boer et al. | 398/9 |
| 6,622,258 B1 * | 9/2003 | Lee et al. | 714/4 |
| 2003/0161629 A1 * | 8/2003 | Frascolla et al. | 398/5 |

* cited by examiner

Primary Examiner—Hassan Kizou
Assistant Examiner—Gregory Sefcheck
(74) Attorney, Agent, or Firm—Kent Daniels; Ogilvy Renault (57) ABSTRACT

A protection switching technique associated with an OP-n sublayer of a communications network is presented. Among the advantages presented by this protection switching technique of the present invention are the ability to provision logical protected subnetworks that are not constrained to the topology of the physical line systems, the ability of a single high capacity link system to support multiple protected subnetworks, the ability to provide complex protection schemes such as m:n protection within the physical link system.

11 Claims, 6 Drawing Sheets

PROTECTION SWITCHING WITHIN AN OP-N LAYER

CROSS REFERENCE TO RELATED APPLICATIONS

This application is related to co-pending and co-assigned U.S. patent application Ser. No. 09/539,707, entitled METHOD AND SYSTEM FOR ESTABLISHING CONTENT-FLEXIBLE CONNECTIONS, which is incorporated herein by reference.

MICROFICHE APPENDIX

Not applicable.

1. Technical Field

The present invention relates to optical communication networks, and in particular to a protection switching system and method within an OP-N sublayer and the use of OP-N links to simplify the management of protected connections in a such a network.

2. Background of the Invention

An important charateristic of communication systems such as fiber optical networks is the type of protection employed aghast failure of transmission in the working channels. In such systems, protection switching techniques are used to switch the transmission of traffic from working channels to protection channels, in case of failure of the working channels. Digital communication systems employ two main protection switching techniques that can be associated with corresponding network architectural layers. The layers of a transport network are described in ITU-T Recommendations G.805 (Generic Functional Architechture of Transport Networks) and G.803 (Architeture of transport networks based on the synchronous digital hierarchy (SDH). The best known SONET/SDH protection switching methods are line switching and path switching, associated with the line layer and the path layer, respectively. The layers and techniques will next be described in terms of SONET terminology, but persons skilled in the art will recognize the applicability of these concepts to other similar standards such as the SDH, or other non-standard transmission schemes.

The Line Layer refers to the maintenance span. A maintenance span forms a segment between two SONET devices, excluding the lower layer regenerators, used to regenerate the digital signals at regular intervals. A single SONET link, from one user site to another may consist of many such spans. The Line Layer manages the transport of entire SONET payloads, which are embedded in a sequence of STS frames, across the physical medium. Associated with the Line Layer there is a set of overhead (OH) bytes, called the Line Overhead (LOH), that provides the layer its ability to perform its functions, its ability to communicate with the layers that surround it and to provide certain protection and maintenance features. The LOH is used and created by SONET line-terminating equipment (LTE).

Line switching within SONET subnetworks works by restoring all working channels of an entire Optical Channel (OC)-n capacity as a single protection operation. The protection capacity is idle when the ring is operating normally and live user traffic is always sent on the working channel. In the event of a failure, the live traffic is switched to the protection fiber at both ends of the span. Channels within the "line' are switched this way, hence the name 'line switching'. Line switching makes use of the LOH to determine failure of the working channels.

The Path Layer covers end-to-end transmission, where end-to-end refers in this case to customer-to-customer transmission. One end of the Path is always where the bits in the SONET Synchronous Payload Envelope (SPE) originate and the other end of the Path is always where the bits in the SPE are terminated. These ends may not be the actual end user devices, such as a desktop workstation or server, but usually refer to some kind of premises SONET multiplexiig devices. A Path Overhead (POH) is associated with this layer and is considered to be part of the SPE and enables the use of functions that ensure overall transmission integrity.

In contrast to line switching, path switching can restore all working channels at a level below the entire OC-n capacity. That is, protection switching can be done on an STS-1 , the basic unit signal in an OC-n, or even at the VT (Virtual Tributary) level if that is what the STS payload is carrying. In order to do this, the signals are sent on both a working and a protection channel across the entire length of the path. The receiving end constantly monitors both and selects the best signal to be used. Path switching makes use of the POH to determine which one of the two channels, working or protection, is better.

With the introduction of high capacity transport systems such as an 80-Gbits/s line system that carries 1536 Virtual Channel(VC-3) signals, line switching may be undesirably inflexible, if 80 Gbits/s granularity is used, whereas path switching may be too complex, if VC-3 (STS-1) granularity is used.

In addition, with line switching, a high capacity line cannot support multiple independent protected subnetworks or unprotected connections. Line switching allows for complex protection schemes such as m:n protection (i.e. m protection lines for n working lines) cable route diversity, physical site diversity, equipment protection only, but at the price of adding a physical line in each case, even though most of the capacity of each line may remain unused.

Path switching allows lonely 1:1 protection since a protection channel is simultaneously used for each working channel. Therefore the protection channel may not be shared, therefore m:n protection schemes with m less than n are not possible.

Therefore there is a need in industry for a protection switching technique that overcomes, at least in part, disadvantages associated with the conventional protection switching techniques.

Open Connections

Co-assigned U.S. application Ser. No. 09/539,707 filed on Mar. 31, 2000, now U.S. Pat. No. 6,735,170 and entitled METHOD AND SYSTEM FOR ESTABLISHING CONTENT-FLEXIBLE CONNECTIONS describes a method for establishing an open connection (OP-N), mapped across a communication network. The OP-N connection includes an overhead channel to support functions such as protection switch signalling, performance monitoring and OP-N trace.

An OP-N connection is basically a bandwidth pipe with the capacity of n STS-1 SPE's in the SONET language, or n/3 STM-1s in the SDH language, routed once from one network node to another network node. Network resources are allocated to the OP-N connection in such a way as to allow the transport of any signal combination which satisfies predetermined concatenation constraints (which are selected for maximum flexibility) and which has an aggregate capacity less than or equal to the maximum allowable capacity associated with the open connection. As a result, the traffic mix (that is, the mixture of concatenated and nonconcatenated signals) conveyed through the OP-N can be changed at the end user's convenience, without the network operator performing any action. For example, an OP-60 connection would support five STS-12c connections one day, one OC-48c and 12 STS-1 connections the next day, and two STS-24 connections and one STM-4 connection on the third day. An OP-n connection can be viewed as a virtual transport line, physically supported within a physical link, but having a capacity smaller than or equal to the capacity of the physical link. Therefore a physical high capacity network may support several OP-n subnetworks. Also, OP-N connections are capable of transiting intermediate physical nodes, along the path of signals they may carry. Protected or unprotected OP-N connections may also be carried across such a system.

Within the SONET architecture, the OP-N structure establishes a new layer between the line and the path layers. An OP-N connection is generally longer than one line, but shorter than a path. One path connection may span several OP-N connections. One OP-N connection may span several lines.

OP-N connections can be nested, i.e. an OP-m may be carried within an OP-N provided that N≧m. This allows, for example, an OP-m to be established over a concatenation of protected OP-N connections. This significantly simplifies the provisioning of connections in large complex networks.

SUMMARY OF THE INVENTION

The present invention seeks to overcome the disadvantages of the prior art associated win protection switching techniques for digital communication systems.

In accordance with one aspect of the invention, there is provided an OP-N protected subnetwork of a communication system. The OP-N protected subnetwork comprises at least one working OP-N connection established between first and second locations within the subnetwork, and a protection OP-N connection established between first and second locations. The working OP-N connection is for carrying traffic of signals in normal operation from the first location to the second location and it includes a logically independent signalling channel for detecting failure of the working OP-N connection. The protection OP-N connection is for carrying the traffic of signals in the event of failure of the working OP-N connection.

In accordance with a further aspect of the invention there is provided a protection switching method comprising: sending traffic normal operation between a first and a second location through a working OP-N connection established between said first and second locations, monitoring for failure of the working OP-N connection on a logically independent sigalling channel associated with the working OP-N connection, and sending traffic between the first and second locations through a protection OP-N connection established between said first and second locations, in the event of failure of the working OP-N connection.

In accordance with yet another aspect of the invention there is provided a communication system comprising a plurality of OP-N protected subnetworks, and a protected OP-mp connection established across at least two of the OP-N subnetworks, with m<=n. Each OP-n protected subnetwork includes at least one working OP-N connection established between first and second locations (subnetwork nodes) and a protection OP-N connection established between the first and second locations. The working OP-N connection is for carrying traffic of OP-N signals in normal operation from the first location to the second location and it includes a logically independent signalling channel for detecting failure of the working OP-N connection. The protection OP-N connection is for carrying the traffic of OP-N signals in the event of failure of the working OP-N connection. The protected OP-N connection comprises a working OP-N connection and a protection OP-N connection. The working and the protection OP-N connections connect a first location within a first OP-N protected subnetwork and a second location within a second OP-N protected subnetwork.

Among the advantages presented by the protection switching method and system of the invention are the ability to provision logical protected subnetworks that awe not constrained to the topology of the physical line systems, the ability of a single high capacity line system to support multiple protected subnetworks, the ability to provide complex protection schemes such as m:n protection within the physical line system.

Other advantages, objects, and features of the present invention will be readily apparent to those skilled in the art from a review of the following detailed description of preferred embodiments in conjunction with the accompanying drawings and claims.

BRIEF DESCRIPTION OF THE DRAWINGS

The present invention will now be explained, by way of example only, with reference to certain embodiments and the attached Figures in which.

Similar references are used in different drawings to denote similar components.

DETAILED DESCRIPTION OF THE PREFERRED EMBODIMENT

The following description is of a preferred embodiment by way of example only and without limitation to the combination of features necessary for carrying the invention into effect.

A protection switching technique associated with an OP-N sublayer of a communications network is presented.

Among the advantages presented by this protection switching technique the invention are the ability to provision logical protected subnetworks that are not constrained to the topology of the physical line systems, the ability of a single high capacity line system to support multiple protected subnetworks, the ability to provide complex protection schemes such as m:n protection within the physical line system.

The present invention is concerned with protection switching within an OP-N layer of a communication system. Aspects of this technique in accordance with the present invention, will be first illustrated by contrasting this technique with conventional line switching and path switching techniques, as applied to a simple linear subnetwork 10 of a digital communication system, with reference to FIGS. 1A, 1B, 2A, 2B, 3A and 3B. Extending the concepts presented in connection to this simple subnetwork topology, chosen only for illustration purposes, to more complex subnetwork topologies as encountered in real networks, will be readily apparent t those skilled in the art.

Figure 1A:
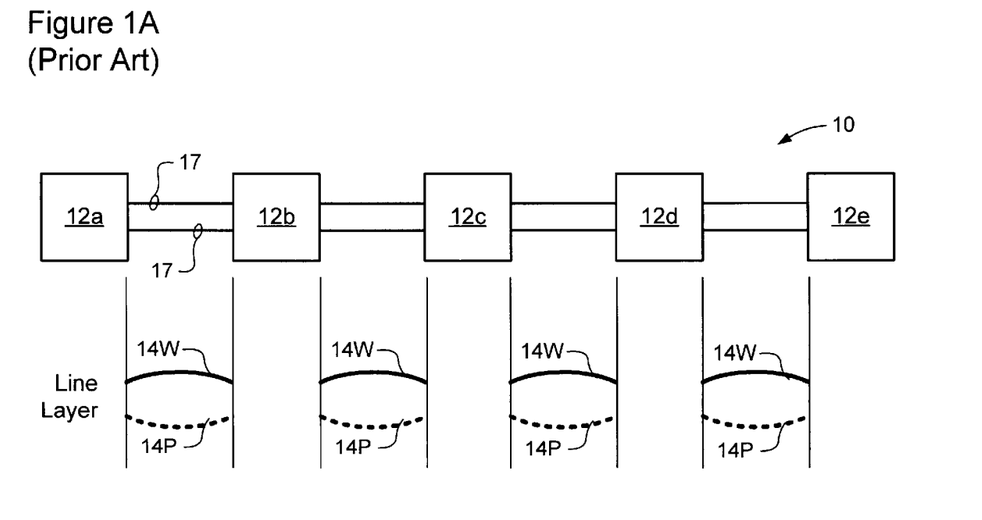
FIG. 1A is a diagram of a linear subnetwork of a communication system protected using line switching.

The linear subnetwork 10 comprises five network nodes 12A–12E, connected by a physical link system (not shown). The subnetwork 10 may be part of a complex digital communication system such as a SONET/SDH fiber optical network. Furthermore, nodes 12A and 12E, in particular, represent the two endnodes carrying traffic between two customers that communicate over the subnetwork 10. Regenerators may be used between nodes for regenerating the traffic signals within a link.

Figure 1B:
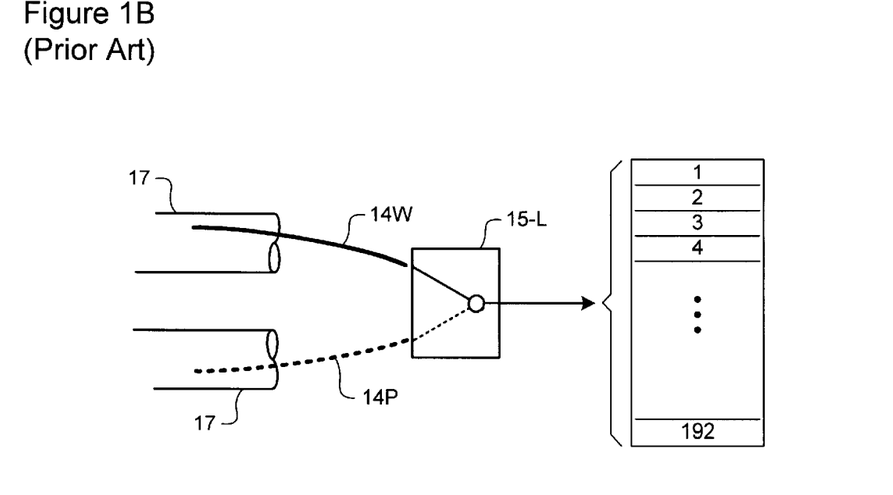
FIG. 1B is a symbolic representation of the capacity used by channels in line switching in FIG. 1A, with respect to the entire capacity of a physicallink.

Referring now only to FIGS. 1A and 1B, the linear subnetwork 10 is protected employing conventional line switching. Working (W) channels or lines 14W and protection (P) channels or lines 14P are provisioned on each of the link segments 17 between adjacent nodes, as defined by the physical link system of the subnetwork 10. Traffic is normally sent onto the working (W) lines 14W and in case of their failure, the traffic is switched by switch 15-L on the protection lines 14P. Each of the W and P lines, 14W and 14P, uses the entire capacity of A single link 17 which for the purpose of illustration, is assumed to be equivalent to OC-192.

Figure 2A:
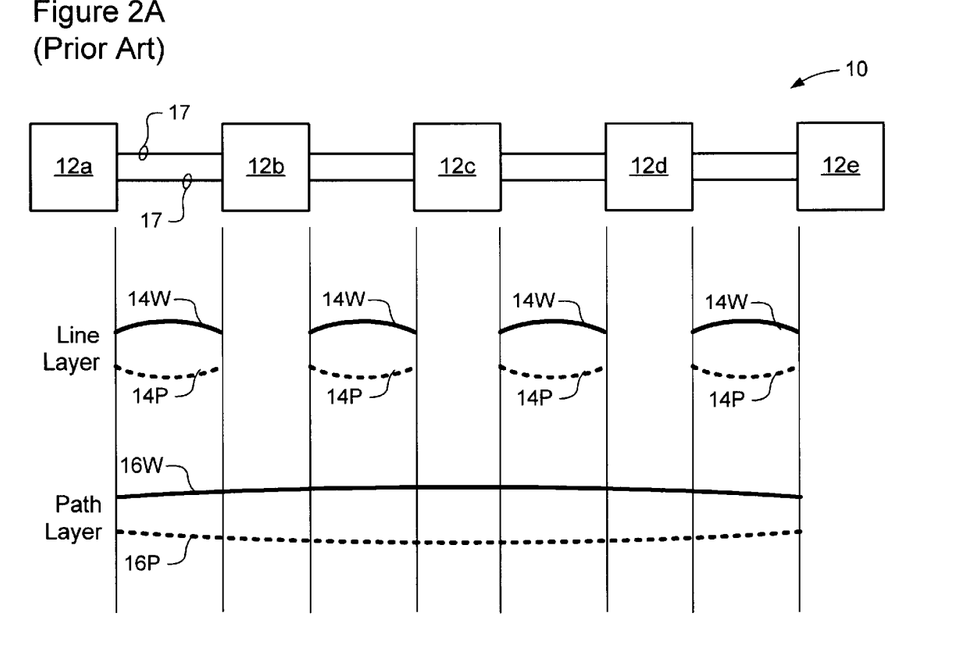
FIG. 2A is a diagram of the linear subnetwork in FIG. 1A, protected using line switching.
Figure 2B:
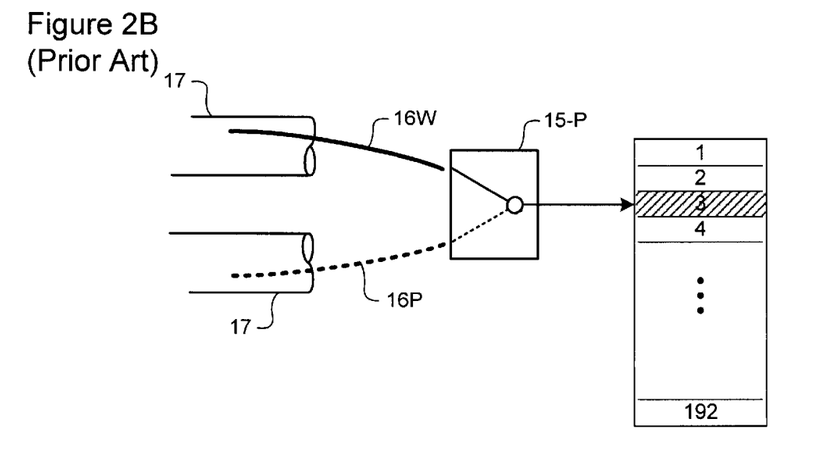
FIG. 2B is a symbolic representation of the capacity used by channels in path switching in FIG. 2A, with respect to the entire capacity of a physicallink.

Referring now to FIGS. 2A and 2B, a path mapped through the subnetwork covers end-to end transmission between customers using the network The linear subnetwork 10 is protected employing conventional path switching, by provisioning a working path 16W and a protection path 16P between node 12A and node 12C. The working path 16W and the protection path 16P are provisioned to support traffic of signals at the smallest allowable granularity, such as STS 1 or VC-3 for in the case of standards such as SONET and SDH, respectively. In particular, FIG. 2B illustrates path switching for an OC 192 signal, where path 16W having 1/192 of the capacity of the entire signal is switched by-path switch 15-P onto path 16P of equal capacity. The protection capacity is not idle in path switching, as traffic is always sent on both working 16W and protection path 16P and the better path is selected upon reception. FIG. 2B illustrates the working 16W and protection 16P paths as being mapped through respective different links 17. It will be understood by those skilled in the art, that in path switching, since these channels have a capacity smaller than the capacity of a link, they may both be included in the same physical link.

Figure 3A:
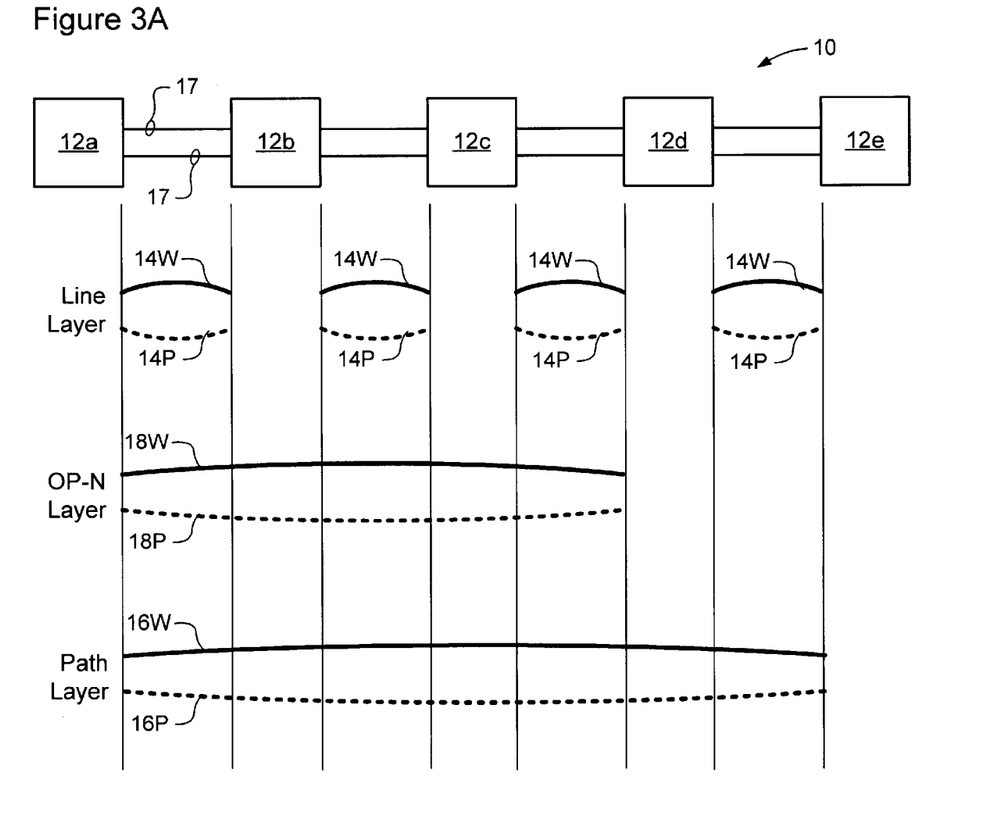
FIG. 3A is a diagram of the linear subnetwork in FIGS. 1A and 2A protected using OP-N protection switching in accordance with an aspect of the present invention.
Figure 3B:
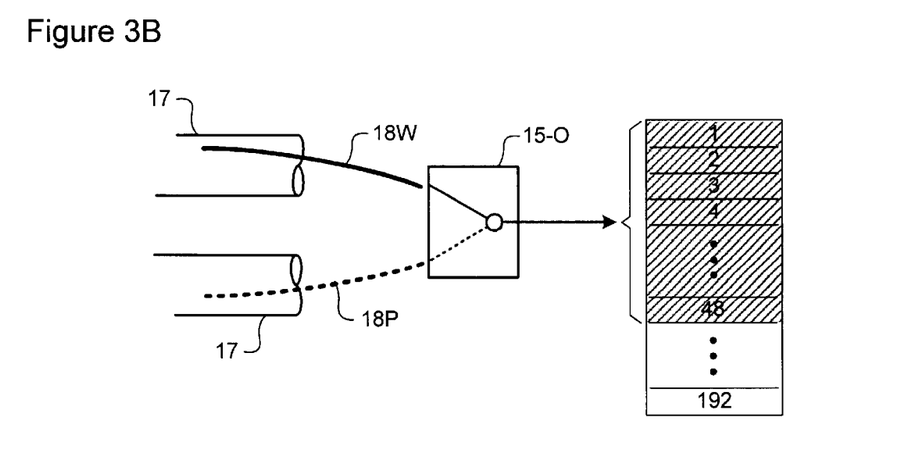
FIG. 3B is a symbolic representation of the capacity used by channels in OP-N protection switching in FIG. 3A, with respect to the entire capacity of a physical link.

Referring now to FIGS. 3A and 3B, the linear subnetwork 10 is protected using an OP-N protection switching technique in accordance with one aspect of the present invention. A subnetwork such as subnetwork 10, which is protected using OP-N protection switching, will be referred herein to as an OP-N protected subnetwork. The subnetwork 10 includes an OP-N layer, associated with OP-N connections 18W and 18P established between nodes 12A and 12D. In protecting the subnetwork against failure, Op-N connection 18W is provisioned as a working (W) connection, and Op-N connection 18P is provisioned as a protection(P) connection. As in the case of line switching, traffic is normally sent on the working connection 18W between the ends of the Op-N connection, nodes 12A and 12D, respectively. In case of failure of the working connection 18W, the traffic is switched onto the protection connection 18P. The capacity of the protection connection 18P is idle in normal operation. In this way, traffic flow is protected between the end nodes of the working OP-N connection 18W and the protection OP-N connection 18P, 12A and 12D, respectively. It will be understood by those skilled in the art that the ends of the OP-N connections 18W and 18P shown in FIG. 3A are chosen only for illustration purposes, but no restrictions exist in this respect in relation to the present invention. The remaining portion of the linear subnetwork 10, from nodes 12D to node 12E, can be or protected by any techniques available, including line switching and OP-N switching, if appropriate OP-N connections are provided The capacity of the Op-N connections 18W and 18P is defined by the network operator, and is generally smaller than the capacity of a single physical link and larger than the smallest allowed bandwidth granularity. In particular FIG. 3B illustrates an example in which Op-N connections 18W and 18P ate OP-48 connection within an OC-192 link system. A switch 15-0 switches the traffic from the working Op-N connection 18W onto the protection Op-N connection 18P in case of failure of the former. Therefore working and protection capacity in this example are both 48/192 of the entire capacity of the link 17. In addition, as in line switching, the protection capacity is idle in normal operation. Furthermore, as in path switching, the working and protection connections may be within the same physical link or in differentlinks, the later case being illustrated in FIG. 3B.

The failure of a working OP-N connection is detected through a logically independent protection switch signalling channel associated with that working OP-N connection. The logically independent protection switch signalling channel can be similar in type to such channels employed in line switching and path switching protection techniques which are known to a person skilled in the art. Such a sigalling channel is associated with trail overbead (OH) bits added to the signals transmitted through the respective channels, line, path orOp-N connections.

Although the OP-N protected subnetwork 10 in FIG. 3A is linear and shows only one working OP-N connection 18W and one protection OP-N connection 18P, it will be understood that in general, an OP-N protected subnetwork may have any shape, linear or ring, and any number of working OP-N connections, linking any of its nodes and at least one protection OP-N connection protecting at least one of the working OP-N connections. Furthermore, the OP-N connections, working and protection, of such network may have different total capacities, i.e. the index n is not the same for all such connections. Since the capacity of an Op-N connection is generally smaller than the capacity of a single physical link and since the Op-N connections are longer than line connections, as they are capable of transiting intermediate nodes, Op-N Protection switching is more flexible than line switching. Specifically, OP-N connections are not restricted by the physical topology of the network and several OP-N connections can coexist within a single physical link system, as allowed by the total capacity of the link system. Therefore, a single high capacity link system may support multiple OP-N protected subnetworks and unprotected Op-N connections. Also, the protection capacity is idle in the case of Op-N connection switching, as in line switching and unlike path switching, a protection Op-N connection can be shared by several working Op-N connections. This results in the possibility of setting up complex protection schemes, such as k:1 protection within a single physical line, where k represents the number of protection OP-N connections and I is the number of working OP-N connections, and k and I are restricted only by the available capacity of the physical link system. Also, it will be understood that since Op-N connections are logical connections, Op-N connections such as 18W and 18P do not have to follow the same geographical path in a network, and their provisioning may be done through different sets of intermediate nodes, as long as the two end nodes are the same. Moreover, it is often preferable that the working and protection OP-N connections in an OP-N protected subnetwork are set to follow different geographical paths in order for the protection scheme to be tailored to a specific service requirement, such as S equipment protection only, cable route diversity, physical site diversity.

Op-N connections can be established in a nested fashion. Specifically, an Op-N connections of a given capacity, say an OP-m connection, can be established within an Op-N connection of a larger capacity, say an OP-N connection where n is greater than or equal to m. This aspect confers even greater flexibility in establishing OP-N protection schemes.

Figure 4:
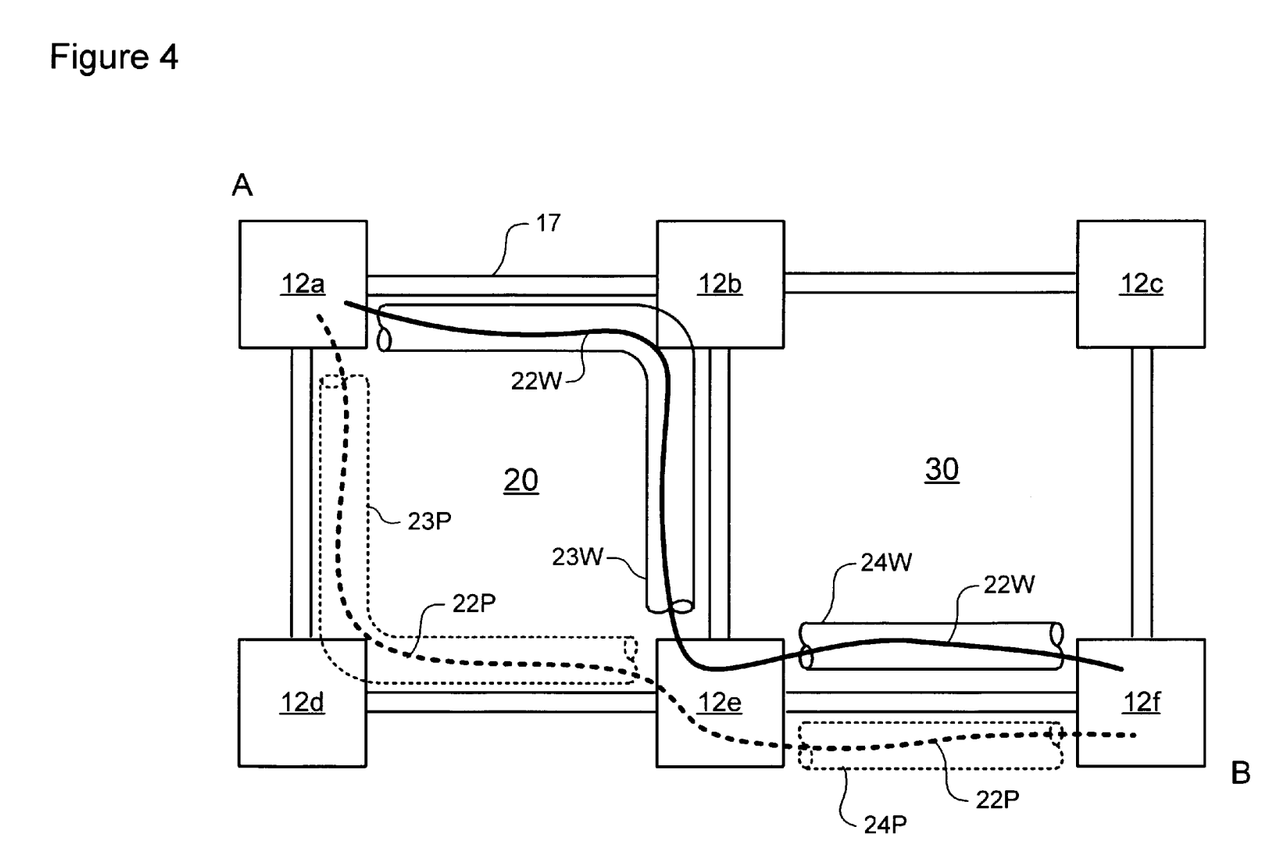
FIG. 4 is a diagram of a communication system comprising an OP-Np connection across two OP-N protected subnetworks in accordance with another aspect of the present invention.

Referring now to FIG. 4, a communication system comprising a protected OP-in connection or OP-mp connection 22, according to a further aspect of the invention, is illustrated. The communication system comprises two independent OP-N protected subnetworks, 20 and 30. The OP-mp connection is established across the subnetworks 20 and 30 between end nodes 12a and 12f. The protected OP-mp connection comprises a working OP-m connection 22W and a protection OP-m connection 22P. Both the working OP-m connection 22W and the protection OP-m connection 22P connect a first location from subnetwork A to a second location in subnetwork B, and they are established, respectively, through working and protection OP-N connections 23 and 24 of the subnetworks 20 and 30. The OP-mp 22 is also an Op-N connection and since it is established within OP-N connections 23, 24, its capacity cannot exceed that of the parent OP-N connections, therefore m is less than or equal to n.

Examples of protected subnetworks that can be supported are linear 1:n or Bidirectional Line Switched Rings (BLSR's).

OP-mp connections may be established over a contiguous set of protected subnetworks, for example two BLSR's with Ring Switched Matched Node (RSMN) interconnection These protected subnetworks may be implemented in the Physical line layer or a OP-N layer using nested OP-ns. This simplifies the subsequent provisioning of end to end lower rate connections since the protection scheme and the interconnection of the subnetworks is provided by the OP-mp.

Since multiple sub layer connections or protected subnetworks can be provisioned by the network operator over a single physical line, each connection or Protected subnetwork need only support a single function. This offers a number of simplifications such as:

selective protection, i.e. unprotected non-preemtable traffic need not be supported on a BLSR, since a dedicated unprotected OP-n connection can be provisioned;

ring connection maps are only required at the OP-n level, versus VC-3 for a conventional SONET/SDH ring;

for high availability East-West connections a laddes network can be established using rings with RSMN interconnection with minimum capacity, i.e. a single protection channel, on North-South protection legs.

Figure 5:
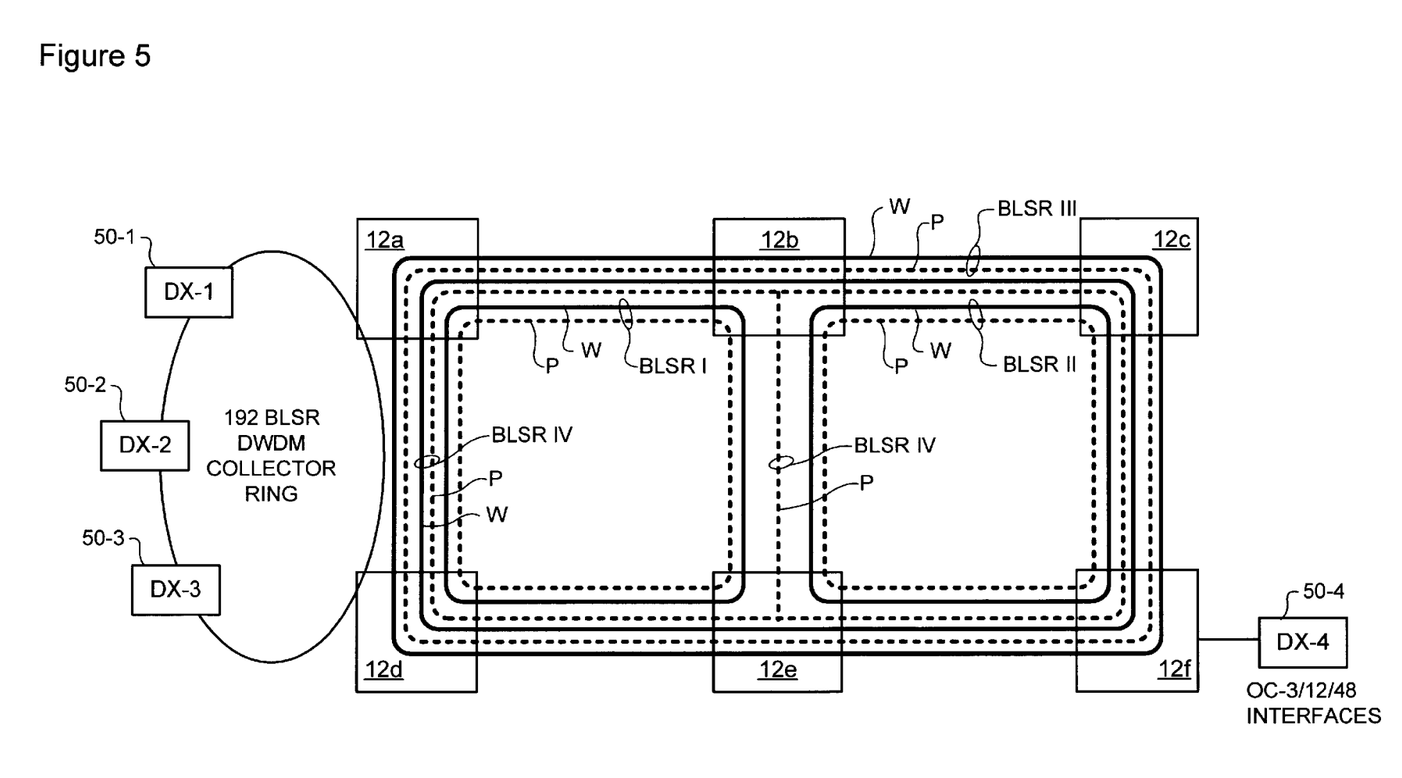
FIG. 5 is an example of a backbone network comprising four Op-N protected Bidirectional Line Switched Rings in accordance with the aspect of the embodiments of FIG. 3A.

The above concepts are illustrated by means of two examples. FIG. 5 illustrates an example backbone network having four OP-n protected subnetworks in accordance with a preferred embodiment of the present invention. The backbone network is formed by six high-density cross-connects (e.g. Nortel Networks Optera Connect HDX) nodes 12a to 12f, linked by high capacity physicallinks 17 (not shown in FIG. 5). The backbone network connects a local 192 BLSR Dense Wavelength Division Multiplexing (DWDDM) collector ring having three local network access nodes (DX), 50-1 to 50-3, to a fourth local network access node 50-4 where OC-3/12/48 signals can be added or dropped from the traffic. Within the backbone network, the OP-n protected subnetworks are all BLSR's, established as follows: BLSR I corrects nodes 12a, 12b, 12d, 12e and has W and P OP-n connections established between all its nodes; BLSR II connects nodes 12b, 12c, 12e, 12f and has W and P OP-n connections established between all its nodes; BLSR III connects nodes 12a, 12b, 12c, 12d, 12e, 12f, and has W and P OP-n connections established between all its nodes; BLSR IV connects nodes 12a, 12b, 12c, 12d, 12e, 12f and has W and P OP-N connections established between nodes 12a and 12b, 12a and 12d, 12b and 12c, 12c and 12f, 12e and 12f and 12d and 12e. BLSP IV also has a P OP-n connection established between nodes 12b to 12e in order to allow Ring Switched Matched Node protection between nodes 12b and 12e. Therefore BLSR IV has the same availability as BLSR's I and II with matched node interconnect, but BLSR IV uses 75% less capacity between nodes 12b and 12e.

Figure 6:
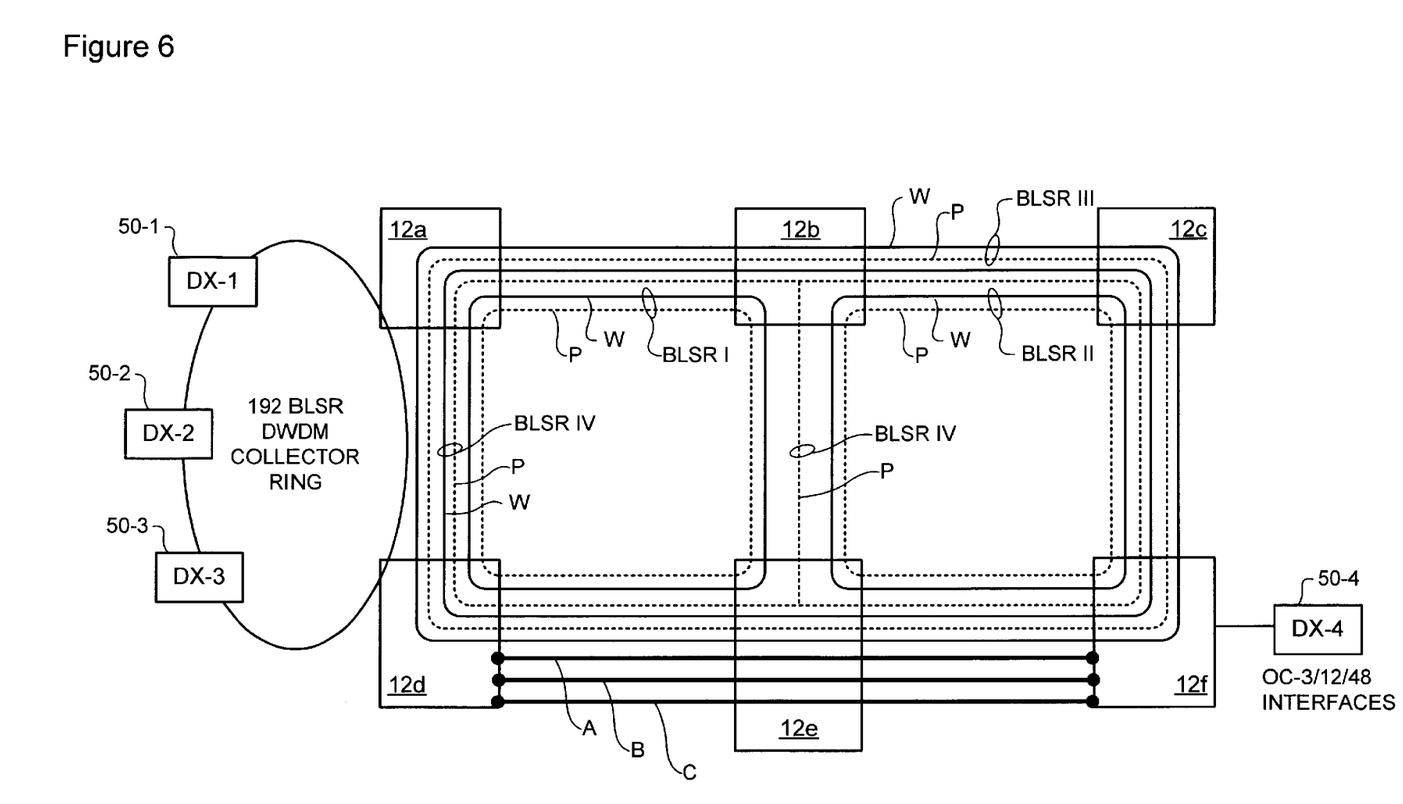
FIG. 6 is an example of a backbone network comprising three OP-mp trunks in accordance with the aspect of the invention illustrated in FIG. 4.

FIG. 6 illustrates another example with a SONET/SDH network with the same configuration as the network in FIG. 5, but is also provisioned with three OP-mp trunks A, B and C. Each of these trunks may be set up using the techniques described above with reference to FIG. 4. The three OP-mp trunks are all provisioned between nodes 12d and 12f and each of the three trunks A, B, and C is set-up to support a single function, as follows: OP-in trunk A is not protected, thus it comprises only working OP-m connections between nodes 12d and 12f. OP-mp trunk B is protected over BLSR III, and OP-in trunk C is matched node protected over BLSR IV.

With the network configuration of FIG. 6 an STS-1 signal for example can easily be sent between DX 50-2 and DX 50-4, as any of: a) unprotected; b) protected over a ring; or c) protected using matched nodes, taken alone or in any combination, by selecting the corresponding HDX nodes 12d and 12f to map the STS-1 signal to traverse the network, respectively, on: a) an unprotected connection within the collector ring between DX2 andnode 12d; the unprotected OP-m trunk A between nodes 12d and 12f; and an unprotected Parallel Optical Interface (POI) between node 12f and DX 4; b) a protected connection within the collector ring between DX2 and node 12d, the OP-m trunk B protected over BLSR III, between nodes 12d and 12f, and a 1:1 protected Parallel Optical Interface (POI) between nodes 12f and DX 4; c)a matched node protected connection within the collector ring between DX2 and node 12d, using nodes 12a and 12d as matched nodes, the OP-m trunk C protected over BLSR IV, between nodes 12d and 12f, and a 1:1 protected Parallel Optical Interface (POI) between nodes 12f and DX 4;

Numerous modifications, variations and adaptations may be made to the particular embodiments of the invention described in the documents attached herein, without departing from the scope of the invention, which is defined in the claims.

The embodiments of the invention in which an exclusive property or privilege is claimed are defined as follows:

1. A communications system comprising:
   at least one working OP-N connection established between first and second having nodes of the network, for carrying signal traffic, a user-changeable concatenation scheme in normal operation the working OP-N connection including a logically independent signalling channel for detecting failure of the working OP-N connection; and
   a protection OP-N connection established between the first and second nodes, for carrying the signal traffic in the event of failure of the working OP-N connection.

2. The communication system in claim 1, wherein the logically independent signalling channel is provided by a trail overhead (TOH) included in each signal passing through the OP-n connections.

3. An OP-N protected subnetwork of a communication system, the OP-N protected subnetwork comprising:
   at least one working OP-N connection established between first and second subnetwork nodes, for carrying signal traffic having a user-changeable concatenation scheme in normal operation, the working OP-N connection including a logically independent signalling channel for detecting failure of the working OP-N connection; and
   a protection OP-N connection established between the first and second subnetwork nodes, for carrying the signal traffic in the event of failure of the working OP-n connection.

4. The protected subnetwork in claim 3, wherein the protected subnetwork is supported by SONET/SDH equipment.

5. The protected subnetwork in any of claims 3 or 4, wherein the protected subnetwork is a linear subnetwork.

6. The protected subnetwork in claim 3, wherein the protected subnetwork is a bi-directional line switch ring (BLSR) subnetwork.

7. A protection switching method comprising:
   sending signal traffic having a user-changeable concatenation scheme in normal operation between a first and a second location through a working OP-N connection established between said first and second locations;
   monitoring for failure of the working OP-N connection using a logically independent signalling channel associated with the working OP-N connection; and
   sending the signal traffic between the first and second locations through a protection OP-N connection established between said first and second locations, in the event of failure of the working OP-N connection.

8. A communication system comprising:
   a plurality of OP-N protected subnetworks, wherein each OP-N protected subnetwork comprises:
   at least one working OP-N connection established between first and second subnetwork nodes, for carrying signal traffic having a user-changeable concatenation scheme in normal operation from the first subnetwork node to the second subnetwork node, the working OP-N connection including a logically independent signalling channel for detecting failure of the working OP-N connection; and
   a protection OP-N connection established between the first and second subnetwork node, for carrying the signal traffic in the event of failure of the working OP-N connection; and
   a protected OP-mp connection established across at least two of the OP-n subnetworks, with m<=n, wherein the protected OP-mp connection comprises:
   a working OP-m connection; and
   a protection OP-m connection,
   wherein the working and the protection OP-m connections connect a first location within a first OP-N protected subnetwork and a second location within a second OP-N protected subnetwork.

9. The communication system as claimed in claim 8 comprising a plurality of protected OP-mp connections.

10. The communication system as claimed in any of claims 8 or 9, wherein selected OP-N protected subnetworks and selected protected OP-mp connections are provisioned to support each a single function.

11. The communication system as claimed in claim 10, wherein the function supported is any one of: unprotected connection, connection protected over a ring or connection protected using Ring Switched Matched Nodes (RSMN).

* * * * *